Feb. 22, 1966     A. M. STOTT     3,236,480

EJECTION APPARATUS

Filed Aug. 31, 1964

INVENTOR.
ALBERT M. STOTT

ATTORNEYS 3,236,480
EJECTION APPARATUS
Albert M. Stott, Southampton, Pa., assignor to the United States of America as represented by the Secretary of the Army
Filed Aug. 31, 1964, Ser. No. 393,463
12 Claims. (Cl. 244—122)
(Granted under Title 35, U.S. Code (1952), sec. 266)

The invention described herein may be manufactured and used by or for the Government for governmental purposes without the payment to me of any royalty thereon.

This invention relates to ejection apparatus and, more particularly to an improved emergency aircraft escape arrangement which reliably functions when confronted with increasingly severe operating conditions and is particularly useful upon high altitude, supersonic aircraft.

One of the objects of the invention is to provide an aircraft having an ejectable encapsulated individual seat with rocket motor means producing an unusually high thrust for a given relatively small space accommodation.

Another object of the invention is to provide the rocket motor means with an actuating arrangement which substantially simultaneously unlocks a capsule to aircraft locking device while igniting the rocket motor means.

In one aspect of the invention a rocket catapult is provided having a plurality of rocket tubes each containing rocket propellant, a housing positioned intermediate the tubes and carrying nozzle means extending transversely of and communicating with the rocket tube propellants, and means communicatively connected to the propellants for igniting the same.

In another aspect of the invention actuating means for the igniting means include means extending externally of the housing to normally cooperate with an adjacent catapult securing arrangement.

Other objects, advantages and features may become apparent from the following description and accompanying drawings in which.

Figure 1:
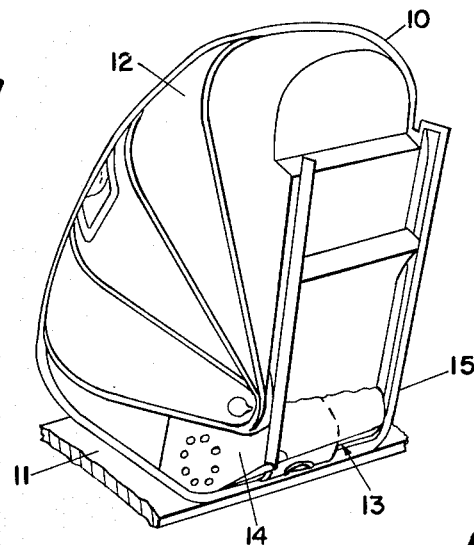
FIG. 1 is a perspective view of an aircraft escape capsule embodying the principles of the invention.

The closed capsule arrangement 10 (FIG. 1) is normally secured on a transversely extending aircraft frame or support member 11 by means hereinafter described, and has an internal seating structure for an occupant of the flight vehicle within collapsible hood 12 as well as transversely oriented rocket catapult shown generally at 13 as extending across the opposed lower rear sidewall portions 14, 15 of the capsule frame.

Figure 2:
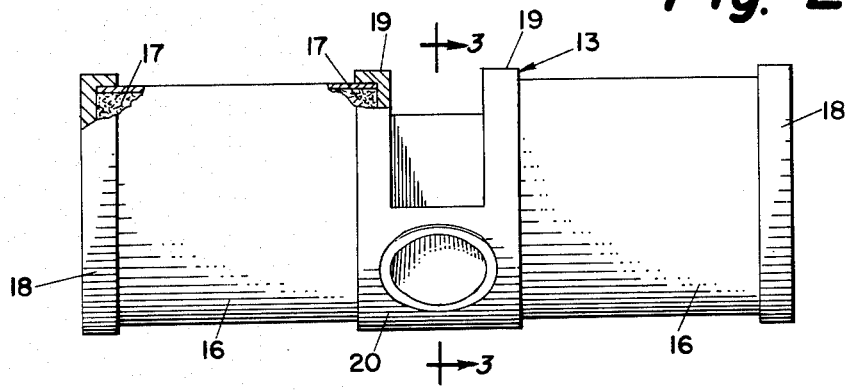
FIG. 2 is a rear elevational view of the capsule rotor motor with portions broken away in section.
Figure 3:
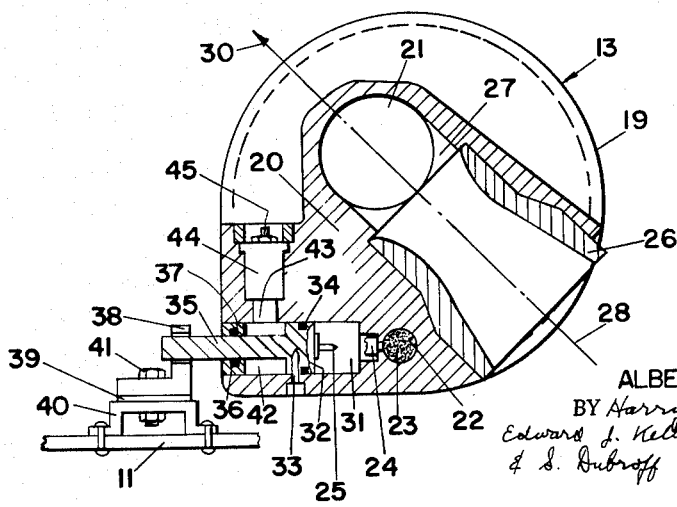
FIG. 3 is an enlarged sectional view taken along line 3—3 of FIG. 2.

The rocket catapult preferably includes a plurality of rocket tubes 16, 16 (FIG. 2) each containing a predetermined quantity and kind of propellant grain 17. The respective end portions of each tube 16 are suitably secured to an end cap 18 and an adjacent outwardly directed annular flange 19 (FIGS. 2, 3) positioned on and integral with either side of central housing 20. The central housing body 20 (FIG 3) is formed with a passage 21 extending transversely therethrough and communicating with the interior of each adjacent rocket tube 16. A similar transverse passage 22 communicatively connects with the respective rocket tube interiors and contains rocket ignition means 23. Igniter 23 is ignited by an appropriate percussion primer 24 and firing pin 25 in a manner to be later described.

A nozzle 26 of predetermined design is secured within a rearwardly and downwardly extending opening 27 that intersects passage 21 substantially at its mid-span so that the nozzle 26 will exhaust the escaping flow of burning propellant pressurized gas along the nozzle axial line 28 in a direction directly away from or opposite the predetermined occupied capsule center of gravity (indicated by arrow 30). In order to develop maximum thrust, it is desirable to obtain simultaneous burning of propellant in the adjacent rocket tubes 16, 16 on either side of ignition means passage 22. If for some reason both rocket tube propellants fail to ignite instantaneously through passage 22, igination of one propellant tube will then ignite its counterpart through interconnecting discharge passage 21.

In the horizontally disposed, forwardly opening piston chamber 31 that terminates rearwardly adjacent an appropriately apertured holder for percussion primer 24, a slidable piston member 32 is secured in a predetermined initial position by shear pin 33 mounted in the housing body and extending through and into suitable vertically aligned openings in the respective housing and piston. The head of piston 32 carries centrally positioned firing pin 25 for striking primer 24 as hereinafter explained, and a sealing O-ring 34. A reduced or stem portion 35 of piston 32 extends forwardly through and past a sealing O-ring 36 of an appropriate retaining member 37 secured to the housing at the forward end of piston chamber 31. The forward or protruding end of piston stem 35 functions as a lock pin, forming a part of and normally retained in an appropriate opening in the catapult locking device 38 which has a flanged lower portion that is secured in a predetermined elevated position above support 11 by bolt means 41 securing shim means 39 of predetermined thickness between the flange portion and transversely extending support 40.

In the normal or initial position of the piston the sealed chamber 42, extending peripherally around piston stem 35 between the piston head 32 and retainer 37, is in communication with outlet passage 43 leading from cartridge 44 containing propellant. At the upper end of the cartridge, an electric ignition element 45 is mounted for actuation by a suitable electric source (not shown) to fire the cartridge propellant. When sufficient propellant gas is generated to develop in chamber a predetermined gas pressure to provide the force necessary to shear off restraining pin 33, the pressure force rapidly moves the piston 32 rearwardly, causing a substantially simultaneous unlocking of device 38 by rearward withdrawal of stem 35 and striking of the percussion primer 24 by firing pin 25.

The percussion primer ignites the ignition element 23 which in turn ignites the rocket propellant grains 17 in adjacent tubes 16, as discussed hereinabove. The gas pressure developed by the burning propellant causes gas to flow out of nozzle 26 at high velocity, and the maximum gas mass so exiting produces an unusually higher thrust than heretofore obtainable for a given quantity of rocket tube propellant or from a given rocket device suitability located within the space accommodation between end caps 18, 18 spanning the width of the capsule rear surface.

Various modifications, alterations or changes may be resorted to without departing from the scope of the invention as defined in the appended claims.

I claim:
1. A rocket structure comprising a plurality of coaxially aligned rocket tubes each containing rocket propellant,
   a housing positioned intermediate said tubes,
   nozzle means carried by said housing and extending transversely of and communicating with said rocket tube propellants, and
   means communicatively connected to said rocket propellants for igniting said propellants.
2. The arrangement in accordance with claim 1 wherein actuating means are provided for said igniting means and include a firing pin responsive to generated gas pressure, and means normally restraining movement of said firing pin until a predetermined amount of said gas pressure has been generated.

3. The arrangement of claim 2 including means connected to said firing pin and extending externally of said housing to normally cooperate with an adjacent catapult securing arrangement.

4. The arrangement of claim 2 wherein said actuating means includes means for developing gas pressure to overcome said restraining means.

5. In an aircraft having a capsule and an ejector arrangement therefor a rocket apparatus secured to said capsule and having a plurality of co-axially aligned rocket tubes each containing rock propellant, a housing positioned intermediate said tubes, nozzle means carried by said housing and extending tansversely of and communicating with said rocket tube propellants, and means communicatively connected to said rocket propellants for igniting said propellants.

6. The structure recited in claim 5 wherein actuating means are provided for said igniting means and include a firing pin responsive to generated gas pressure, and means normally restraining movement of said firing pin until a predetermined amount of said gas pressure has been generated.

7. The structure of claim 6 including means connected to said firing pin and extending externally of said housing to normally cooperate with an adjacent catapult securing arrangement.

8. The structure of claim 6 wherein said actuating means includes means for developing gas pressure to overcome said restraining means.

9. In an aircraft having a capsule and an ejector arrangement therefor, rocket motor means secured to said capsule for imparting thrust thereto, means normally locking said capsule to said aircraft, and single ignition means connected to said locking means for simultaneously igniting said rocket means and unlocking said normally locking means.

10. In a vehicle seat arrangement having a supporting frame portion extending rearwardly of as well as below a predetermined occupant-seat center of gravity, a rocket assembly mounted on said seat frame portion, said rocket assembly including a plurality of elongate propellant chambers and nozzle means therefor, said chambers being co-axially aligned, said nozzle means extending transversely of and communicating with said chambers, and said nozzle means being so oriented that the center line of its thrust lies in a plane which substantially approaches said center of gravity.

11. In a vehicle seat arrangement having a lateral frame portion extending forwardly and rearwardly of as well as below a predetermined occupant-seat center of gravity, and a back frame portion located substantially rearward of said center of gravity, a rocket assembly mounted on at least one of said seat frame portions, said rocket assembly including a plurality of elongate propellant chambers and nozzle means therefor, said chambers being co-axially aligned, said nozzle means extending transversely of and communicating with said chambers, said chambers having portions lying substantially forward of said back portion, and said nozzle means being so oriented that the center line of its thrust lies in a plane which substantially approaches said center of gravity but makes a substantial angle with the longitudinal axes of said propellant chambers.

12. The combination with a vehicle having an ejectable seat, of a rocket ejection unit comprising a plurality of elongate rocket propellant charges arranged in co-axial alignment below the surface of the seat, and nozzle means extending transversely of and communicating with said charges, said nozzle being addressed downwardly in a direction such that the center line of thrust therefrom is in a plane which embraces a point proximate a predetermined occupant-seat center of gravity.

References Cited by the Examiner

UNITED STATES PATENTS

| Re. 25,612 | 7/1964 | Thorp | 244—122 |
|---|---|---|---|
| 2,535,820 | 12/1950 | Temple | 89—1.5 |
| 2,702,680 | 2/1955 | Heinemann et al. | 244—140 |
| 2,873,648 | 2/1959 | Musser et al. | 89—1 |
| 3,079,111 | 2/1963 | Thorp | 244—122 |
| 3,124,324 | 3/1964 | Martin | 244—122 |
| 3,126,177 | 3/1964 | Markowitz | 244—122 |

MILTON BUCHLER, *Primary Examiner.*

FERGUS S. MIDDLETON, *Examiner.*

D. P. NOON, B. BELKIN, *Assistant Examiners.*